Figure 1:
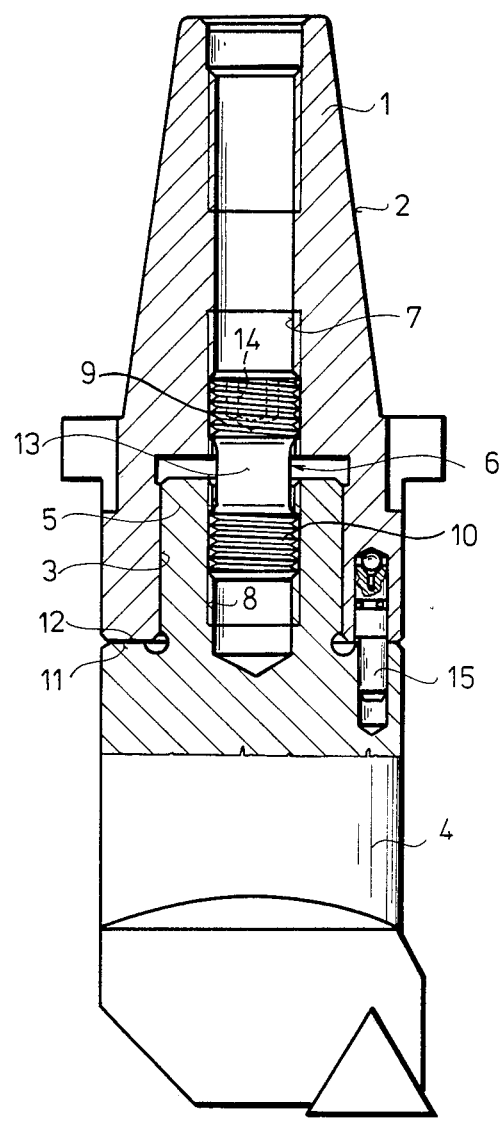

United States Patent [19]

Dudás et al.

[11] Patent Number: 4,557,642
[45] Date of Patent: Dec. 10, 1985

[54] COUPLING ARRANGEMENT FOR MODULAR TOOL-SYSTEMS

[75] Inventors: Ferenc Dudás; Iván Lévárdy, both of Budapest, Hungary

[73] Assignee: Forgacsoloszerszamipari Vallalat, Hungary

[21] Appl. No.: 585,889

[22] Filed: Mar. 2, 1984

[30] Foreign Application Priority Data

Mar. 15, 1983 [HU] Hungary .............................. 875/83

[51] Int. Cl.⁴ ............................................. B23B 31/04
[52] U.S. Cl. ..................................... 408/239 R; 279/8
[58] Field of Search ............... 408/239 R, 239 A, 238; 409/232, 233, 234; 279/1 A, 1 TS, 8

[56] References Cited

U.S. PATENT DOCUMENTS 1,994,792  3/1935  Sanderson ........................ 279/8 X
3,719,367  3/1973  Baturka ............................ 279/1 A
4,099,889  7/1978  Vig .................................... 279/8 X Primary Examiner—James M. Meister
Attorney, Agent, or Firm—Handal & Morofsky

[57] ABSTRACT

The coupling arrangement according to the invention is universally used for modular tool-systems and its simple construction allows economic production. The threaded bore of one of the elements to be engaged is provided with thread identical with that of the other element, and differential screw is screwed into these threads, furthermore the driving element is such driving pin one half of which is fitted into the parallel and excentric bore of one of the elements, while the diameter of the other half is smaller, its end excentrically arranged in relation to the former half is provided with a conical end section and fitted into the bore of the other element.

7 Claims, 3 Drawing Figures

COUPLING ARRANGEMENT FOR MODULAR TOOL-SYSTEMS

The invention relates to coupling arrangement for modular tool-systems, first of all for engagement of a basic body and/or adapter and/or extension piece and/or tool clamped into the main spindle of machine-tools, where one of the engaged elements has a center bore, while the other one has a locating pin fitting into the bore and both are provided with means for driving the one element together with the other one, wherein one of the elements has a threaded bore leading into the center bore and being coaxial with it, while the other element is also provided with a threaded centre bore.

The main spindle tips of the drilling-milling machines and machining centres were extremely varied even earlier. The different automatic tool-clamping devices brought about further versions and multiplied the already large number of coupling methods. Consequently neither the tool-set of the machines, nor the manufacture of the tools can be improved with the tools of fixed construction consisting of a single piece and bearing the characteristic features of a machine. Thus it is advantageous to separate the part attached to the machine-tool and the part used for holding the cutting tools and their coupling with a suitable clamping system. This way it is possible to interlink the identical tool-holding devices with different elements connectible to the machines, and several types of tool-holding devices too are connectible with the same type of machine coupling element.

The control gears of the up-todate machine-tools are provided with such facility, that following the completion of a bore with a single-blade tool, the cutting tip is lifted out of the bore by removing from the machined surface. Requirement for this is, however, the suitable position of the fixed point of the main spindle and of the tip of the tool in relation to each other, depending on the type of control.

The tool clamping devices consisting of several parts are conventional /see for instance DE-PS No. 14 77 140; DE-OS Nos. 3039 156; 31 08 071; 30 08 189; 28 31 660; DE-GM No. 75 29 1961. The coupling elements are generally formed in such a way, that the locating pin machined on one of the units is engaged with the center bore of the other unit.

In one of the known solutions the engaging units are provided with threaded part beyond the locating pin and with a bore for screwing them together. The simplicity of this solution is apparent, but the fixed position of the given part of the main spindle and the tip of the tool in relation to each other is not ensured. Such device is practicable only if it is used in the closing direction of the thread characteristically in case of right handed turn. Anti-torque moment would result in loosening of the device.

In another known solution the coupling of the elements is ensured by locating pin and bore, as well as by a screw with conical tip arranged perpendicularly to the center of the former ones, which fits tightly into the conical insert of the locating pin. This joint—since the clamping force is not concentric—does not result in perfect planar seating of the faces and in adequate rigidity of the coupling.

Accordingly to a further known solution, the coupling elements are engaged similarly by locating pin and bore, and fixed with socket-head bolt which is inserted through a ring, and the ring is fixed by thread or cross-directional pins in the continuation of the center bore, the bolt is screwed into the threaded bore formed in the locating pin. This formation is suitable in respect of transmitting the concentric clamping force, but its drawback is that the ring built in in a simple way /with thread/ involves the risk of disengagement. Even if this is avoided—by preventing the turn—the possibility exists that galling or deformation of the small elements loaded with great force will deteriorate the rigidity of the joint.

Object of the present invention is the elimination of the above drawbacks and providing such a coupling arrangement which completely fulfils the listed requirements and its simple build-up ensures economic production.

According to the invention, the threaded bore of one of the elements to be engaged is provided with a pitch direction identical with, but steeper than that of the other element and a differential screw is screwed into these threads, furthermore the means for driving is a driving pin one half which is fitted into a bore of one of the elements, said bore arranged parallel and excentrically in relation to the centre bore, while the diameter of the other half is smaller and excentrically arranged in relation to the former half and has a conical end section and is fitted into the bore of the other element.

A cylindrical neck is formed between the threaded parts of the differential screw, and the pitch ratio is preferably 1:2. The differential screw is provided suitably with socket-head and in given cases with through-hole.

The driving pin may be supported by ball in axial direction in the large diameter bore and/or may be fixed with ring and/or arranged in insert formed on the mantle. If the coupling arrangement consists of more than two elements, then the driving pins are arranged preferably on identical axial plane and radius.

The construction according to the invention enables the correct seating of the faces as a result of the concentric force effect of appropriate extent, and realization of the adequately solid and rigid coupling between the tool-carrying, clamping and extension elements. The device has no fast-wearing parts which would require frequent replacement. The specially shaped driving pin ensures fitted coupling through the simply machinable bores, without the risk of redundancy, thus it is capable for transfer of high moment, since its load approaches the pure shear, on the other hand it ensures the loadability of the device with moment of optional direction. Coupling of the main spindle of the machine-tool or the preferred point of the engaged element and the tip position of the tool are significant characteristically in the finishing process of the bore, because of the utilization possibility of the tool lifting cycle given by the control process. The different controls require different tool-tip positions in relations to the fixed position of the main spindle. The improvement further enables to follow these different requirements in such a way, that partly the driving pin determines the generally used position, and partly in a different case it can be fixed in the optional position, making use of the fact, that the differential screw—through its threaded sections of identical pitch—ensures self-locking in the direction of the pitch. The device according to the invention ensures the possibility to guide the cooling-lubricating liquid admitted through the main spindle to the tip of the tool by use of differential screw provided with through-hole.

Figure 2:
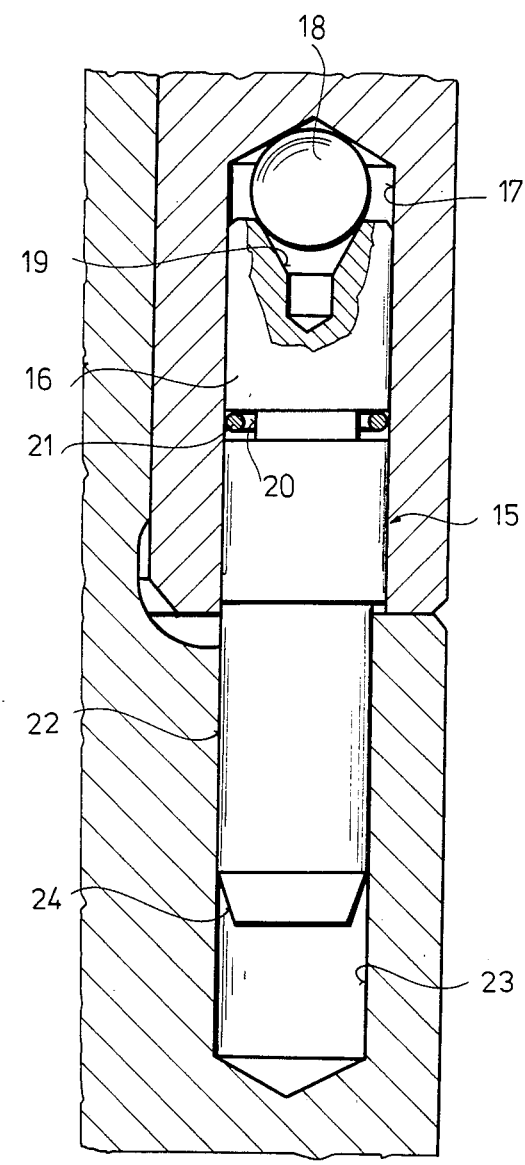
Figure 3:
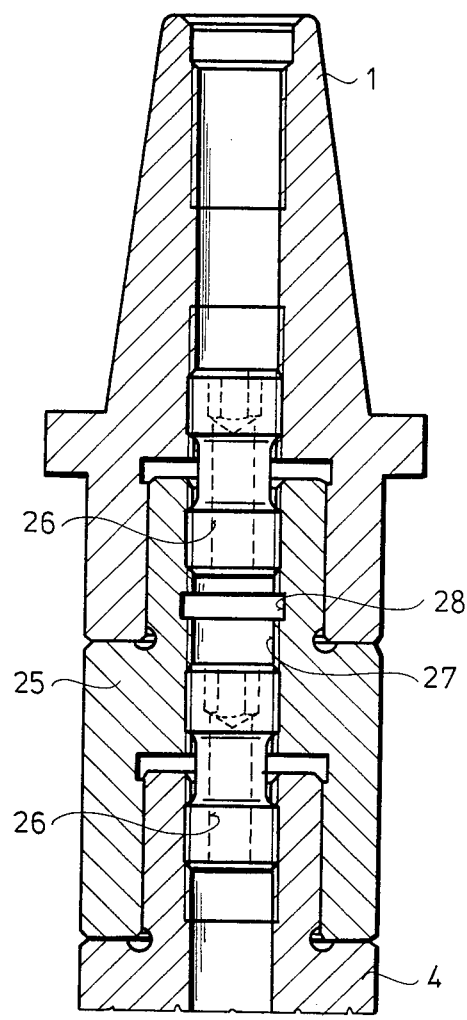

Further details of the invention are described by way of example with the aid of drawing, in which:

FIG. 1: arrangement according to the invention in case of direct coupling of steep cone and turning tool, FIG. 2: the driving pin shown in FIG. 1, FIG. 3: coupling arrangement according to the invention in the engagement of steep conical basic body, extension piece and optional tool holder.

FIG. 1 shows the coupling arrangement of the basic body and turning tool in sectional view. Specification of the steep conical basic body corresponds to that of the machine-tool. The locating pin 5 of tool 4 fits into the uniaxial bore 3 with conical surface 2. The rigid connection of the basic body 1 and tool 4 is ensured by differential screw 6. This is screwed into the threaded centre bore 7 of the basic body 1 and its other end fits into the threaded bore 8 of tool 4. The thread on the threaded part 9 of the differential screw 6 fitting into the threaded bore 7 of the basic body 1 is less coarse—suitably half as much—than the threaded parts 10 on the other end, the nominal size of which is the same. This threaded part 10 is screwed into the threaded bore 8 machined in tool 4, thus when the differential screw 6 is turned in closing direction—suitably to the right—as a result of the pitch difference, the face 11 of the basic body 1 and face of the tool 4 approach each other, then they bear upon each other according to the force corresponding to the tightening moment. Movement of the differential screw 6 in the threaded bore 7 and 8 is ensured by the cylindrical neck 13, the diameter of which is less than that of the core diameters. The differential screw 6 is provided with socket-head 14 allowing its turn.

Turn of the basic body 1 and tool 4 in relation to each other is prevented by driving pin 15. Its formation is shown in FIG. 2. The upper part 16 of driving pin 15 is turnably fitted into bore 17 of basic body 1. The turnable axial position is determined by ball 18 placed on the bottom of the bore through tip-nest 19. The driving pin /15/ is kept in position /allowing its turn/ by split elastic ring 21 arranged in a groove 20 formed approximately in the centre of the upper part 16.

The lower part 22 of the driving pin 15 fits into bore 23 of tool 4, and it is excentric in relation to the upper part 16. Diameter of the lower part 22 is reduced by the double value of the eccentricity in relation to the upper part 16. The eccentricity enables to make the bores 17 and 23 with relatively loose manufacturing positional tolerance without the risk of redundancy and overstrain. For this reason the added dispersion of the position of bores 17 and 23 measured from the nominal value shall not exceed the double value of the excentricity.

Upon engagement, the bore 23 contacts the conical part 24 machined on the lower part 22 of the driving pin 15 and turns the driving pin 15 into such position, that the lower part 22 is capable to move into bore 23, thus resulting in safe entrainment.

FIG. 3 shows an embodiment of the invention, where an extension insert 25 is arranged between the basic body 1 and tool 4. The upper part of extension insert 25 is identical with the formation of the joining part of tool 4, while its lower part is identical with the formation of the basic body 1. Accordingly the method of fixing and entrainment is identical with those described in connection with FIGS. 1 and 2.

As shown in the diagram, in this case the differential screw 6 is provided with bore 26 to ensure the internal flow of a cooling-lubricating liquid. Diameter of bore 26 is limited by the size of the socket-head 14.

The parts of different pitch in the threaded bore 27 formed in the extension insert 25 are separated from each other by insert 28.

The presented examples demonstrate that the invention enables fast and safe coupling between the tools and milling machines, at the same time it is simply and easily producible. The joining parts are interchangeable, thus the optional combination of the elements is possible and the economical assembly of the optimal tool-set is ensured.

Though only a few examples were shown in the description for the formation of the device, it is obvious that many other alternatives are also possible within the limits of the following claims.

What we claim is:

1. Coupling arrangement for modular tool-systems for the engagement of a basic body clamped into the main spindle of machine-tools, where one of the engaged elements has a center bore, while the other one has a locating pin fitting into the bore, and wherein both elements are provided with a fixing or driving element, one of the elements has a threaded bore leading into the center bore and being coaxial therewith, and the other element is also provided with a threaded center bore, wherein the threaded bore of one of the elements is provided with a screw pitch direction identical with, but steeper than that of the other element, and a differential screw is screwed into these threads, said driving element is a driving pin, one half of said pin is fitted into a bore of one of the elements, said bore being arranged parallel and eccentrically in relation to the center bore, while the diameter of the other half is smaller and being arranged eccentrically in relation to the former half and has a conical end section and is fitted into the bore of the other element.

2. Coupling arrangement as claimed in claim 1, characterized in that the pitch ratio of the threaded parts /9,10/ of the differential screw /6/ is 1:2.

3. Coupling arrangement as claimed in claim 1, characterized in that a cylindrical neck is formed between the threaded parts of the differential screw.

4. Coupling arrangement as claimed in claim 1, characterized in that through-hole is formed in the full length of the differential screw.

5. Coupling arrangement as claimed in claim 1, characterized in that the differential screw is provided with a socket-head.

6. Coupling arrangement as claimed in claim 1, characterized in that the driving pin is carried in axial ball-bearing in the large diameter bore and/or it is fixed with split elastic ring arranged in insert formed on the mantle.

7. Coupling arrangement as claimed in claim 1, characterized in that it consists of more than two elements, where all driving pins are arranged along identical axial plane and radius.

* * * * *